Aug. 1, 1950 R. M. HESSERT 2,517,107
APPARATUS FOR FILLING CONTAINERS WITH ICE CREAM, WITH
CUTTER MEANS AND CONTAINER CONTROLLED CIRCUIT
BREAKING MEANS FOR STOPPING THE APPARATUS
Filed April 3, 1945 4 Sheets-Sheet 1

INVENTOR.
RAYMOND M. HESSERT
BY Joshua R.H. Potts
HIS ATTORNEY.

INVENTOR.
RAYMOND M. HESSERT
BY Joshua R. H. Potts
HIS ATTORNEY.

Patented Aug. 1, 1950

2,517,107

UNITED STATES PATENT OFFICE 2,517,107

APPARATUS FOR FILLING CONTAINERS WITH ICE CREAM, WITH CUTTER MEANS AND CONTAINER CONTROLLED CIRCUIT BREAKING MEANS FOR STOPPING THE APPARATUS

Raymond M. Hessert, Buffalo, N. Y.

Application April 3, 1945, Serial No. 586,378

4 Claims. (Cl. 226—19)

This invention relates to the dispensing of ice cream and similar materials, and is concerned primarily with apparatus which is designed to effect a completely mechanical operation in getting the ice cream from the bulk into a retail container.

At the present time, substantially the same procedure obtains in the retailing of ice cream as has been the practice for many years past. The manufacturer puts the ice cream up in suitable bulk lots, such as three gallon, or five gallon cylindrical containers. These are kept by the retailer in the ordinary refrigerating cabinet, and when a customer desires a given amount, say, for example, one quart, the retailer uses a spoon, ladle, or scoop, and removes from the bulk glob after glob until the quart package is filled. The disadvantages attending this practice are believed to be clearly obvious and self-evident. In the first place, this repeated use of the scoop, or ladle, does not lend itself to maintaining high sanitary standards. The scoop, or ladle, is ordinarily immersed in water when not in use, and this means that on each occasion when a retail container is to be filled the merchant takes the scoop from the water, uses it the required number of times, and then places it back in the water. There are always small quantities of ice cream which adhere to the scoop, and this dissolves in the water, with the result that it soon becomes highly unclean.

Another disadvantage which attends this practice is that it is not practical, and substantially impossible to fill the containers with any appreciable uniformity in the packing of the ice cream. On some occasions, large air spaces and voids will be present, and this results in a dissatisfied customer.

These and other disadvantageous features of the prevalent method of dispensing ice cream to the retail trade has long been recognized, and certain devices have been proposed, which were directed to the achievement of mechanical dispensing. However, for many reasons, all of which, perhaps, cannot be pointed out with certainty, the known devices have not been accepted by the ice cream people. One reason for this lack of acceptance is believed to be due to the fact that the apparatus heretofore offered has been highly complicated, and, from its very nature, discourages adoption. Another reason is that certain of the mechanical contrivances designed for this purpose require some special shape of the bulk ice cream, which would involve a departure from present day ice cream manufacturing practice. It also might be pointed out that other mechanisms require the positioning of the bulk ice cream in a horizontal position, which, as a practical matter, is found to be undesirable.

With all these factors and conditions in mind, this invention has in view as its foremost objective the provision of apparatus for dispensing ice cream, which will be simplified as compared to known mechanisms, not involve any change in the conventional bulk ice cream, and will keep the bulk ice cream in a substantially vertical position at all times.

In carrying out this idea in a practical embodiment, the invention contemplates the use of a refrigerating cabinet that will offer substantially the same general outward appearance as the present day ice cream cabinet. This cabinet is designed to house the dispensing apparatus itself, together with the bulk ice cream on which it operates. The only part of the dispensing apparatus, which need not be contained within the cabinet, is the power source, such as an electric motor, which may be located on the exterior of the cabinet, and includes a drive shaft extending into the interior of the cabinet.

A highly important object of the invention is the provision of dispensing apparatus of the type above noted, which operates on the bulk ice cream from the bottom upwardly. This means that the bulk ice cream in its container is inverted as it is assembled in operative relation with the mechanism of this invention. In view of this principle of operation, the invention has as a further object the provision of ice cream dispensing mechanism, which includes means for cutting into a lower exposed surface of bulk ice cream. In order to render the cutting means effective it is necessary that the bulk ice cream be held against rotative movement. Accordingly, a further object of the invention is the provision, in ice cream dispensing apparatus of the character indicated, of means for holding an inverted container of bulk ice cream against rotation.

When a fresh container of bulk ice cream is first introduced to the dispensing mechanism, it has appreciable weight, which would probably be sufficient to urge the ice cream against the cutting means. However, as more and more of the bulk ice cream is cut off, the weight of the remainder diminishes, and it, therefore, becomes necessary to provide means for supplementing the weight of the ice cream in urging the bulk ice cream against the cutting means. Accordingly, another object of the invention is the provision, in ice cream dispensing apparatus of the character indicated, of means for urging bulk ice cream against the cutting means. In actual practice this may take the form of a weight, which bears against the upper end of the bulk ice cream when the latter is in inverted position.

Another highly important object of the invention lies in the provision of mechanism for driving the cutting means. Thus, the cutting means, which may take the form of a plurality of rotatable blades are drivably connected with the motors on the exterior of the cabinet.

It is evident that merely cutting ice cream from the inverted bulk container is not a complete answer to the problem. The ice cream, which is cut off, must be delivered to an accessible point where it may be packed in the retail container. In view of this requirement, the invention has, as a further object, the provision of ice cream dispensing apparatus of the type noted, which includes a table immediately beneath the cutting blades. This table is formed with a slot into which the cut-off ice cream passes. Extending downwardly from this slot is a channel, through which the ice cream drops. The channel opens into a casing containing a feed screw, which moves the cut-off ice cream laterally.

Mere lateral movement of the cut-off ice cream away from the dispensing mechanism might be sufficient under some circumstances, but this invention has in view, as another highly important object, the provision, in ice cream dispensing mechanism, of ice cream conveying means, which moves the cut-off ice cream into a position in which it may be readily packed in a retail container. In carrying out this idea, a vertically extending casing, housing another feed screw, communicates with the laterally extending casing and feed screw.

Another object of the invention is the provision, in ice cream dispensing apparatus of the type noted, of conveying means, together with a container holding device, which co-operates with the conveying means in filling a retail container. Thus, provision is made for holding a retail container with its open end in communication with the vertically extending casing. Thus, the feed screw in the latter packs the ice cream in the retail container.

Yet another object of the invention is the provision in ice cream dispensing apparatus of the character indicated of means for automatically disabling the dispensing apparatus when a retail container, of a predetermined size, has been packed. In carrying out this idea, control switches are included in the circuit of the motor, which operates the apparatus, and these control switches are actuated when a container is filled to stop the dispensing apparatus.

Another object of the invention is the provision in ice cream dispensing apparatus of the type indicated of means for automatically indicating when the supply of bulk ice cream is depleted. This means may take the form of a signal alone, and also may be tied up with the circuit of the motor, so that when the supply is exhausted the operation of the dispensing apparatus will be automatically stopped.

Various other more detailed objects and advantages of the invention, such as arise in connection with carrying out the above noted thoughts in a practical embodiment, will in part become apparent, and in part be hereinafter stated as the description of the invention proceeds.

The invention, therefore, comprises ice cream dispensing apparatus adapted to be housed in a refrigerating cabinet, and which includes means for cutting into bulk ice cream from a lower exposed surface, together with means for holding the bulk ice cream against rotation, means for urging the bulk ice cream against the cutting means, conveying means for conveying cut-off ice cream to an accessible point, a retail container holding device, automatic disabling means for stopping operation of the dispensing apparatus when a retail container is filled, and means for indicating when the supply of bulk ice cream is depleted.

For a full and more complete understanding of the invention reference may be had to the following description and accompanying drawings, wherein.

Figure 1:
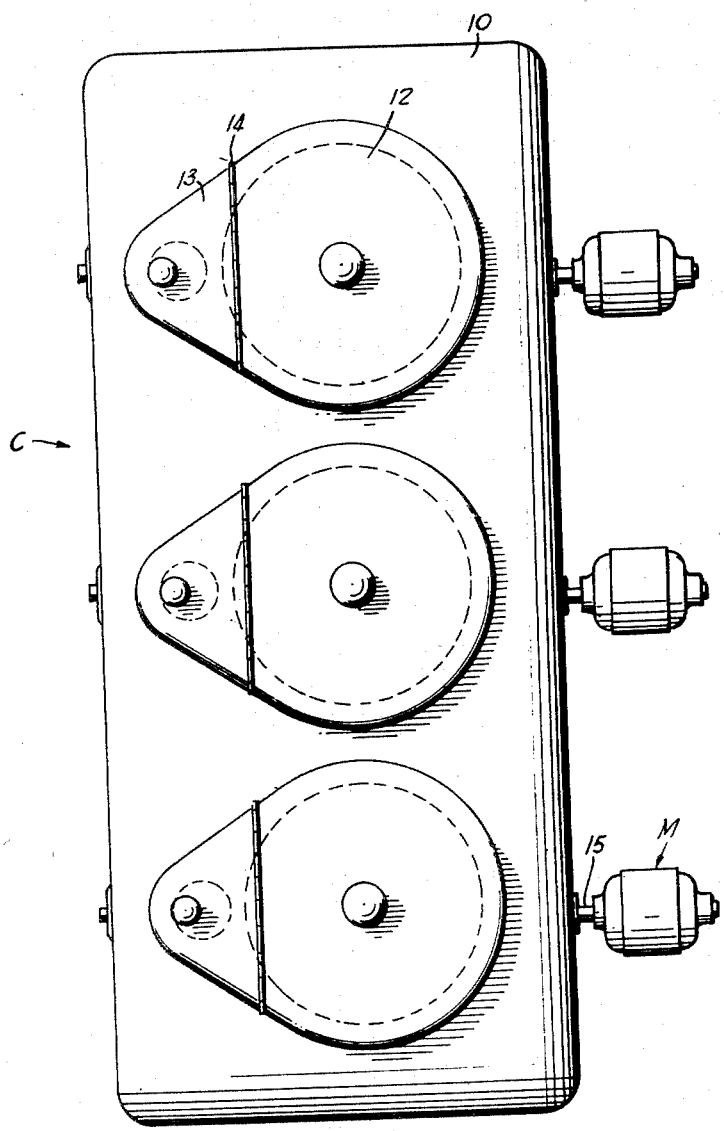
Figure 1 is a top plan view of a refrigerating cabinet, including ice cream dispensing apparatus designed in accordance with the precepts of this invention.
Figure 2:
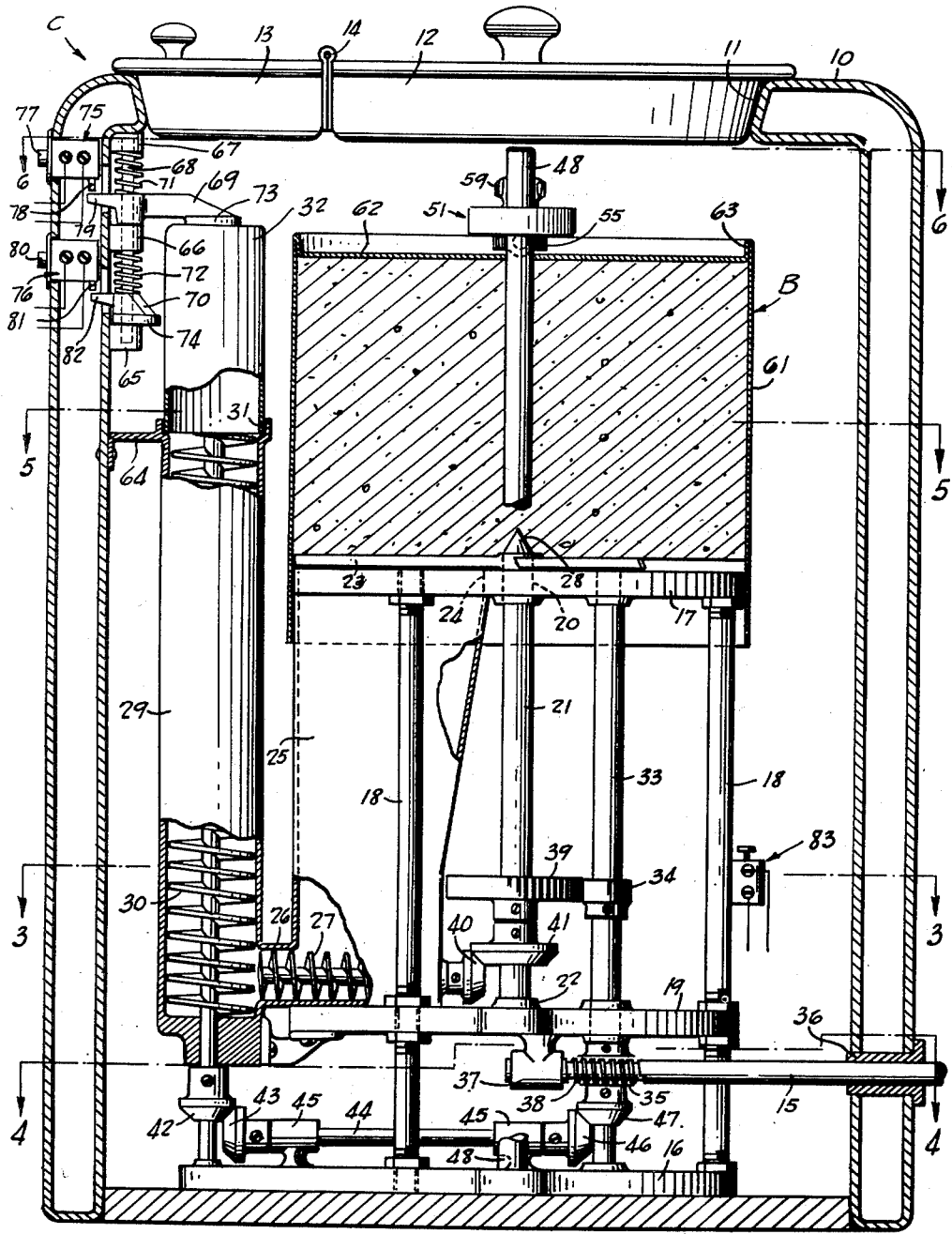
Figure 2 is a vertical, transverse section taken on an enlarged scale, as compared to Figure 1.
Figure 3:
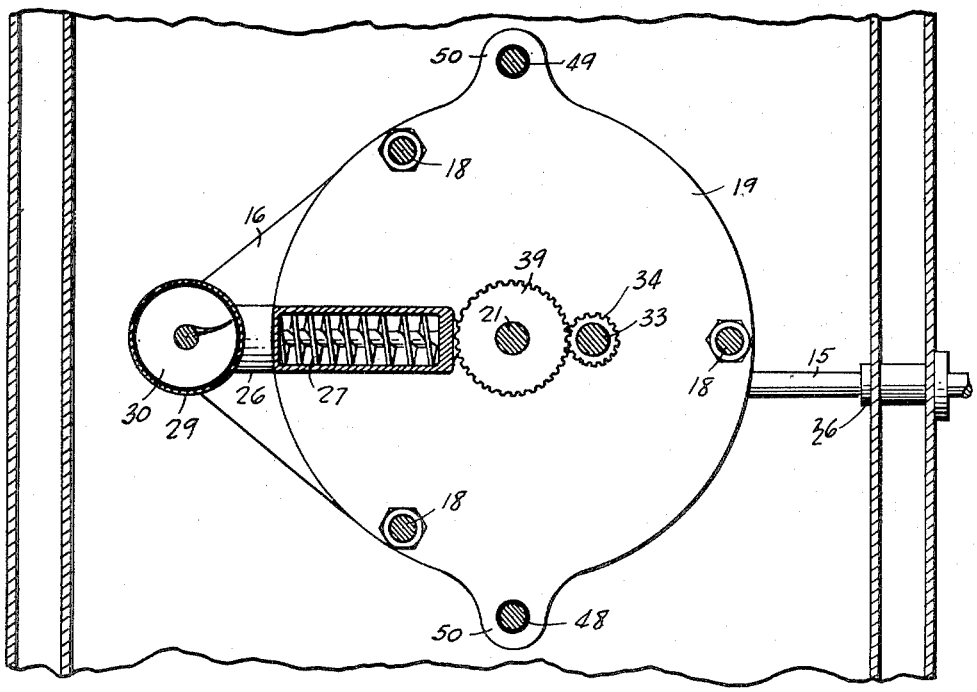
Figure 3 is a fragmentary, horizontal section taken about on the plane represented by the line 3—3 of Figure 2.
Figure 4:
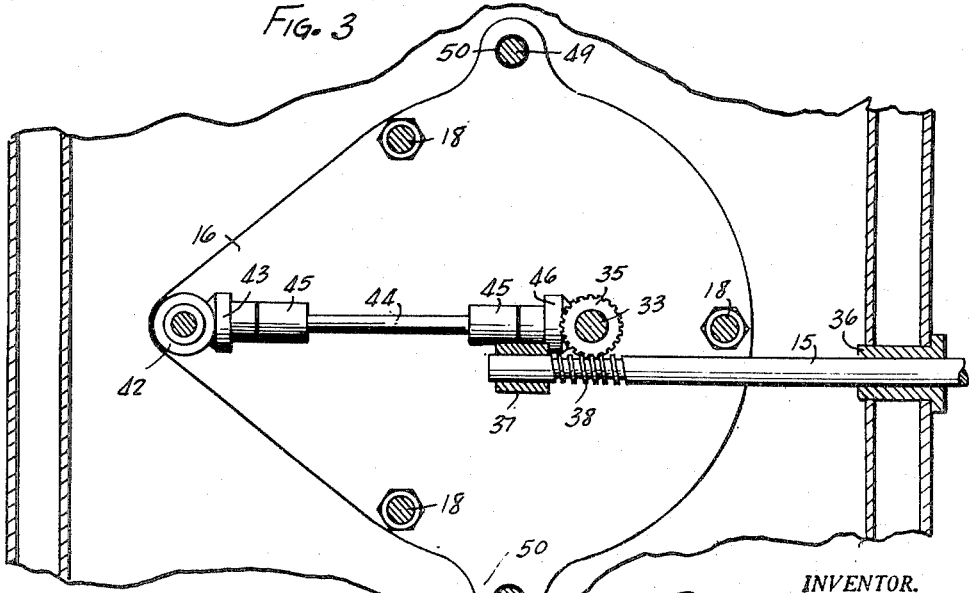
Figure 4 is another fragmentary, horizontal section taken about on the plane represented by the line 4—4 of Figure 2.

Referring now to the drawings, wherein like reference characters denote corresponding parts, and first, more particularly, the Figure 1, a refrigerating cabinet is therein illustrated, and identified generally by the reference character C. The cabinet C includes a top 10, which is formed with a number of openings corresponding to the number of dispensing units, which are to be contained within the cabinet. In the form of the invention illustrated in the drawings, the cabinet C is designed to accommodate three (3) dispensing units. Thus, the top 10 is provided with three (3) openings, 11 (Figure 2). Received in each of the openings 11 is a cover assembly, comprising a large cover 12, and a small cover 13, the two being hingedly connected, as shown at 14. The cover 12 extends immediately over the dispensing apparatus proper, and it is through this cover that the bulk ice cream will be passed, or depleted containers removed. The small cover 13 is employed in conjunction with the retail containers, as will be later pointed out.

As shown in Figure 1, there is an electric motor M for each of the dispensing units. Each of these motors M has a drive shaft 15, which extends through a side wall of the refrigerating cabinet.

Referring now more particularly to Figure 2, the dispensing apparatus proper is shown as being operatively mounted on a framework comprising a base 16, a table 17, and upright supporting elements 18, together with an intermediate horizontal support 19.

Figure 5:
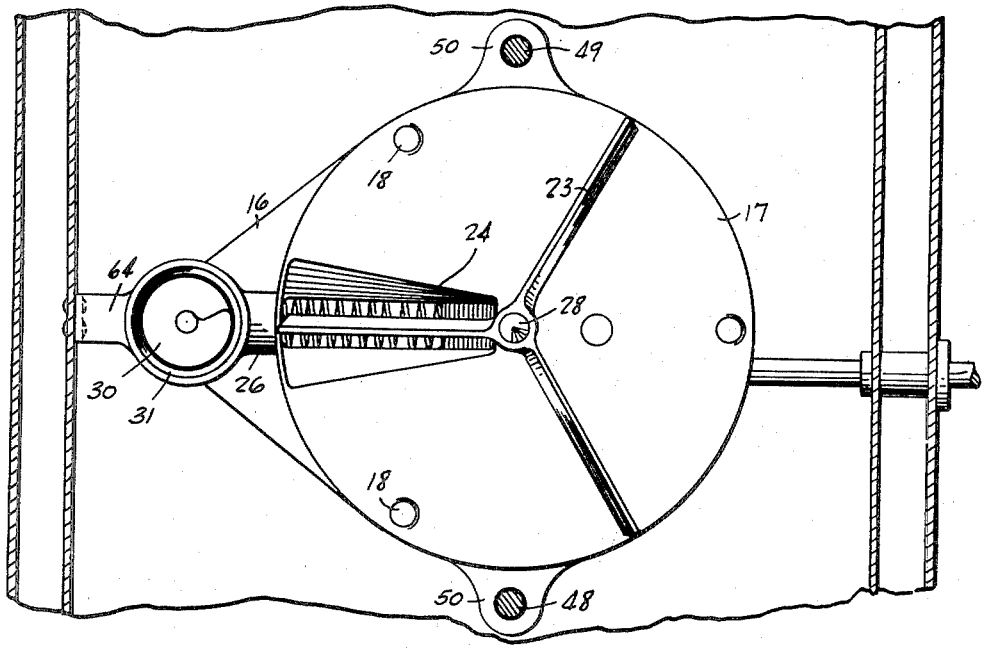
Figure 5 is an other detail, horizontal section taken about on the plane represented on the line 5—5 of Figure 2.
Figure 6:
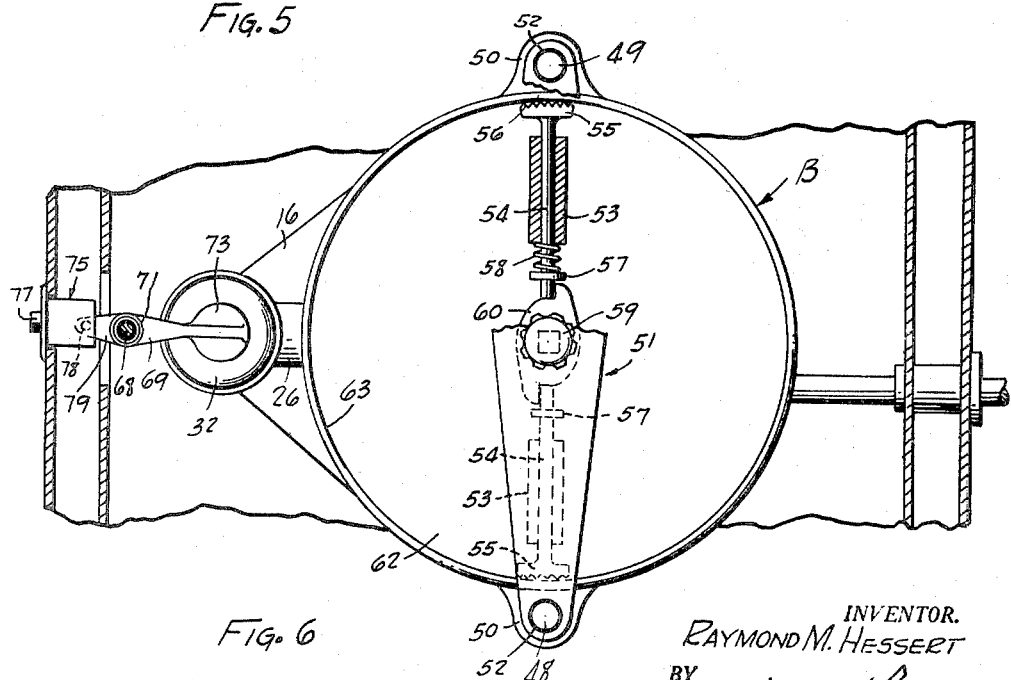
Figure 6 is still another detail, horizontal section taken about on the plane represented by the line 6—6 of Figure 2.

The table 17 is circular in formation, and is dimensioned to be fitted into the interior of a standard size container of bulk ice cream with a fair degree of accuracy. The table 17 is formed with a central opening 20, through which extends a central drive shaft 21. At the lower end, the drive shaft 21 has bearing on the horizontal support 19, as indicated at 22. Immediately above the table 17, the shaft 21 drivably carries the cutting elements 23. These cutting elements are clearly shown in Figure 5, and in the illustrated form of the invention are three (3) in number, although, obviously, the number of blades employed can be varied as the occasion demands. The table 17 is also formed with a slot 24, and extending downwardly from this slot is a chute 25, which, at the bottom, opens into, and is connected with a casing 26, which encloses a feed screw 27. The upper end of the shaft 21, immediately over the cutting blades 23, is pointed, as shown in 28, for the purpose of enabling it to bite into and core the bulk ice cream.

Connected to the casing 26, and communicating therewith, is a vertically extending cylindrical casing 29, which houses another feed screw 30. The upper end of the casing 29 is slightly enlarged to provide a circular shoulder at 31, which is adapted to receive and support a cylindrical shaped retail container, such as the quart size, illustrated at 32. A pint size retail container would have the same diametrical dimension, but would be of shorter length.

It is evident that the cutters 23, and the feed screws 27 and 30, must be driven from the motor M. To accomplish this, the following described mechanical arrangement is employed. Extending from the table 17, through the horizontal support 19, and to the base 16, in which parts it has suitable bearings, is an idling shaft 33, which drivably carries a pinion 34, and a worm gear 35. The motor drive shaft 15 extends into the side wall of the cabinet C, as above indicated, a bearing shown at 36 being employed for this purpose. At its inner end the shaft 15 is journalled in a bearing 37 that depends from the horizontal support 19. Adjacent this bearing 37, the motor shaft 15 is formed with a worm 38, which meshes with the worm gear 35. Thus, the motor shaft 15 serves to drive the idling shaft 33.

Meshing with the pinion 34 is a gear 39, which is drivably mounted on the central drive shaft 21. Thus, the shaft 21 is driven from the shaft 33. The inner end of the feed screw 27 drivably carries a bevelled gear 40, which meshes with a complemental bevelled gear 41, keyed on the shaft 21. Thus, the feed screw 27 is driven by the central drive shaft 21.

The lower end of the feed screw 30 drivably carries a bevelled gear 42, which meshes with the complemental bevelled gear 43, on a shaft 44. The shaft 44 is journalled in bearings 45, carried by the base 16, and the other end of the shaft 44 drivably carries a bevelled gear 46, which meshes with the complemental bevelled gear 47, as keyed to the shaft 33. Thus, the feed screw 30 is driven from the shaft 33. It is evident that when the motor M is in operation the cutting blades 23, and the feed screws 27 and 30, will all be simultaneously operated.

Carried by the supporting framework are a pair of vertically extending uprights 48 and 49, which may be mounted in ears 50, projecting outwardly from the table 17 and base 16. These uprights 48 and 49 extend an appreciable distance over the table 17. In fact, they stop just short of the top 10 of the cabinet C.

A weight element 51 is formed at each end with openings 52, which receive the uprights 48 and 49. The underface of the weight 51 carries a pair of brackets 53, each of which slidably receives a rod 54. The outer end of each of the rods 54 is formed with a head 55, which may have a serrated surface, shown at 56, for a purpose to be later described. The inner end of each rod 54 carries a flange 57, and an expansion spring 58 is interposed between the flange 57, and the bracket 53. The normal tendency of the springs 58 is to retract the heads 55.

Rotatably mounted in the weight member 51 is an operating member 59, which is carried on a shaft that extends through the weight member. Keyed to the lower end of the shaft is a cam 60, which is formed with a pair of cammed surfaces, each of which engages the inner extremity of one of the rods 54. It is evident that the member 59 may be rotated to move the rods 54 outwardly against the influence of the springs 58. When the cam 60 is positioned to release the rods 54, the springs 58 will move inwardly.

A standard container of bulk ice cream is referred to in its entirety by the reference character B. The container B comprises a cylindrical wall 61, the diameter of which is slightly in excess of the table 17, so that the cylindrical wall 61 may pass thereover. The bulk container B also contains a bottom 62, having a downwardly extending peripheral flange 63. This flange 63 is shown in Figure 2 as extending upwardly, this because of the inverted position of the container B.

When in position, the serrated surfaces 56 of the heads 55 engage the inner surface of the flange 63, and thus hold the container B against rotation.

The upper end of the casing 29 is shown as being anchored to a side wall of the cabinet C by bracket 64. Immediately above this bracket 64, the same side wall also carries spaced ears 65, 66, and 67. A rod 68 extends through, and is anchored to these ears. Rotatably and slidably mounted on the rod 68 is an upper arm 69, and a lower arm 70. An expansion spring 71 is coiled about the rod 68, and is interposed between the ear 67, and upper arm 69. Another expansion spring 72 is coiled about the rod 68, and is interposed between the ear 66 and the arm 70. The outer end of the arm 69 carries an enlarged head 73, which bears against the quart container 32, and the lower arm 70 has a similar enlarged head 74 that is adapted to bear against a pint container.

A pair of control switches are shown at 75 and 76 as being mounted in the cabinet walls. Each of these control switches will be in the motor circuit. Thus, when either switch is operated to close the circuit, the motor will start, and when that switch is again operated in a reverse manner the motor will stop. Switch 75 is shown as including a push button 77, which may be shoved in to complete the circuit, and a contact arm 78, which is adapted to be engaged by projection 79 on the arm 69 to break the circuit. Similarly, the switch 76 has a push button 80, and a contact arm 81, adapted to be engaged by projection 82 on the arm 70. It is evident that after the quart container 32 is filled with ice cream the arm 69 will be moved upwardly against the influence of the spring 68, thus, causing the projection 79 to engage the contact arm 78, and break the motor circuit. In exactly the same way, if a pint container is positioned beneath the head 74 of the arm 70 when it is filled, it will move the arm 70 upwardly to cause the projection 82 to engage the contact arm 81, and break the motor circuit.

The supporting framework may, at an appropriate point, include a switch 83, which is also included in the motor circuit. This switch 83 is adapted to be engaged by the open top edge of the cylindrical wall 61 of the bulk container B when the latter is emptied. Thus, when the container B is emptied the motor circuit is automatically broken. If desired, an indicator light may be suitably located and connected to the switch 83, so that when the container B is emptied visible notice of the fact will be given.

*Operation*

Before inserting a container of bulk ice cream it is, of course, necessary to remove the weight 51 from the uprights 48 and 49. This is a simple matter, as the weight is freely slidable on the uprights. With the weight removed, a container of bulk ice cream in inverted position is inserted through the opening 11, this being permitted by opening the cover 12. The container B is placed with the exposed face of the ice cream in engagement with cutting blades 23. The weight 51 is now replaced on the uprights 48 and 49, and, after it has fallen down as far as possible, the operating member 59 is twisted to cause the cam 60 to move the rods 54 outwardly. This causes the serrated surfaces 56 to engage the peripheral flange 63, whereby the container or bulk ice cream is held against rotation. The apparatus is now ready for the dispensing of ice cream.

If a customer wishes to purchase a quart of the ice cream, a quart container, such as that shown in 32, is placed with its open mouth resting on the shoulder 31, whereupon the arm 69 is swung so that the head 73 engages the bottom of the inverted container. Push button 77 is now shoved in to complete the motor circuit, and the motor is started in operation. This causes rotation of the cutter blades 23, and at the same time the screws 27 and 30 are driven. Ice cream is cut from the exposed surface of the bulk by the blades 23, and falls through the slot 24 and chute 25, down onto feed screw 27. The latter moves the ice cream laterally and feeds it to the screw 30. In turn, the screw 30 moves the ice cream upwardly into the retail container 32. When the latter is packed, it moves upwardly, and actuates the arm 69 against the influence of the spring 68, to break the motor circuit. All that is necessary for the merchant to do is to remove the filled container, which is rendered accessible by opening the cover 13. When the supply of bulk ice cream is depleted, the lower edge of the cylindrical wall 61 engages the switch 83, and disables the motor, at the same time lighting up a signal light, which also may be included.

The above described operation is exactly the same in filling a pint container, the only difference being that the arm 70 is employed in lieu of the arm 69, and in starting the operation the push button 80 is availed of rather than the push button 77. While a preferred, specific embodiment of the invention is hereinbefore set forth, it is to be clearly understood that the invention is not to be limited to the exact constructions illustrated and described, because various modifications of these details may be provided in putting the invention into practice within the purview of the appended claims.

What is claimed is:

1. In an apparatus for dispensing ice cream, in combination, a support, a container for bulk ice cream arranged on said support, a power operated rotary cutter engageable with ice cream in said container, a chute receiving ice cream cut from the container, a horizontally positioned feed screw arranged in the apparatus and effective to remove ice cream from the chute, a vertically positioned second feed screw arranged in the apparatus, a second container yieldingly positioned over the said second feed screw, and switch means engageable by said second container when it is filled with ice cream to a predetermined degree, said switch means being operable to deenergize said power operated cutter.

2. In an apparatus for dispensing ice cream, in combination, a casing, a support in the casing, a container for bulk ice cream arranged on said support and slidable relatively thereto, cutting means engageable with ice cream within the container, power operated means for rotating said cutter, a plurality of feed screws operatively associated together and effective to remove ice cream from said casing after it has been scraped from the container by the cutting means, a second container arranged in parallel relation to one of said feed screws and in position to receive ice cream therefrom, and electric switch means engaged by said second container and operable to deenergize the power-operated means when the second container is filled with ice cream.

3. In an apparatus for dispensing ice cream, in combination, a casing, a support in said casing, a cover normally closing the casing but giving access thereto when desired, a container for bulk ice cream slidably mounted on said support, weight means resting on said container and normally urging same in a downward direction, a cutter engaging bulk ice cream within the container, a chute arranged beneath the container and serving to receive ice cream scraped therefrom by the cutter, a plurality of feed screws arranged adjacent said chute and effective to convey ice cream from the chute and thence upwardly to a second container, said second container being yieldingly positioned in the casing, and electric switch means contactable by said second container and effective to deenergize other means connected to and actuating said cutter.

4. In ice cream dispensing apparatus of the kind described, a support, a shaft journalled in said support, a cutting assembly carried by said shaft, a drive shaft arranged adjacent said first mentioned shaft and parallel thereto, gearing operatively connecting said shafts, a pair of conveying means arranged in plane normal to each other and actuated through the intermediary of said drive shaft, means to receive material cut by the cutting assembly and forwarded by the conveying means, and circuit-breaking means engageable by the last mentioned means and automatically effective to stop the normal operation of said apparatus.

RAYMOND M. HESSERT.

REFERENCES CITED

The following references are of record in the file of this patent:

UNITED STATES PATENTS

| Number | Name | Date |
| --- | --- | --- |
| 1,068,153 | Mittendorf | July 22, 1913 |
| 1,333,094 | Reed | Mar. 9, 1920 |
| 1,502,347 | Nelson | July 22, 1924 |
| 1,700,819 | Bert | Feb. 5, 1929 |
| 1,704,784 | Brubaker | Mar. 12, 1929 |
| 1,770,739 | Lush et al. | July 15, 1930 |
| 1,799,755 | Loughridge | Apr. 7, 1931 |
| 1,866,842 | Curtis | July 12, 1932 |
| 1,921,199 | Maskery | Aug. 8, 1933 |
| 2,337,161 | Hessert | Dec. 21, 1943 |
| 2,385,579 | King et al. | Sept. 25, 1945 |